W. E. HOWARD.
AUTOMOBILE INCLOSURE.
APPLICATION FILED JAN. 21, 1918.
1,313,186. Patented Aug. 12, 1919.
2 SHEETS—SHEET 1.
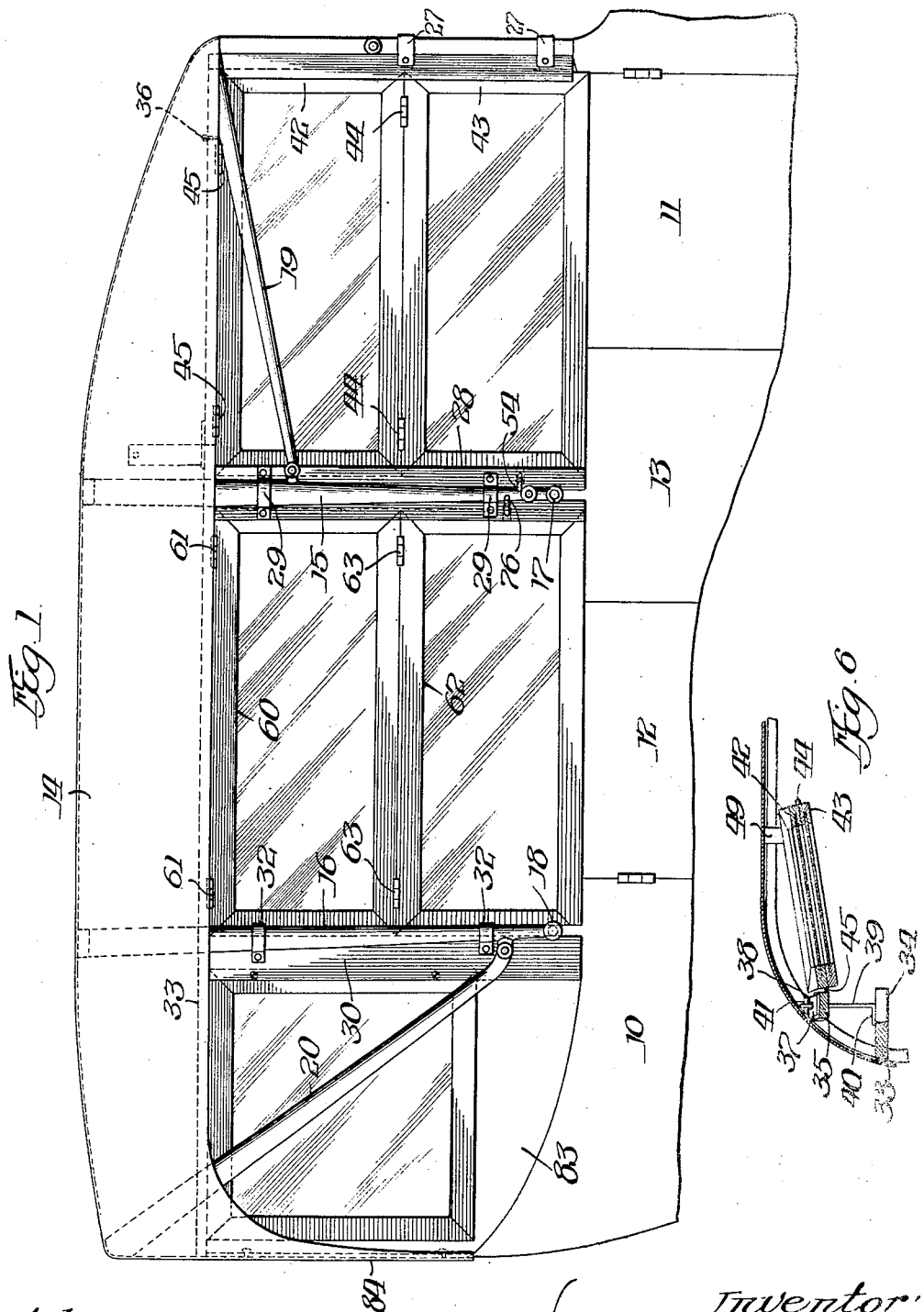
Witness
Geo. E. Larion
Inventor:
Wallace E. Howard
By Walter M. Fuller
Atty.

W. E. HOWARD.
AUTOMOBILE INCLOSURE.
APPLICATION FILED JAN. 21, 1918.
1,313,186.
Patented Aug. 12, 1919.
2 SHEETS—SHEET 2.
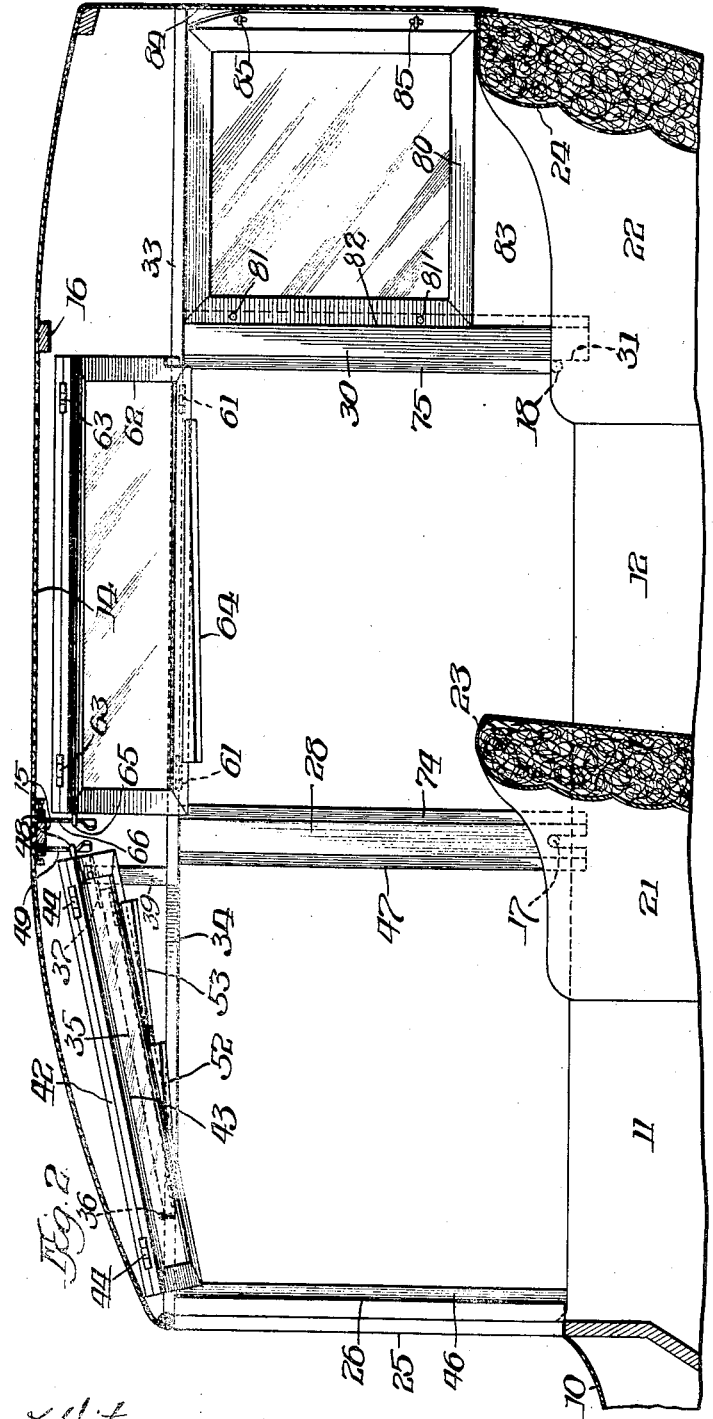
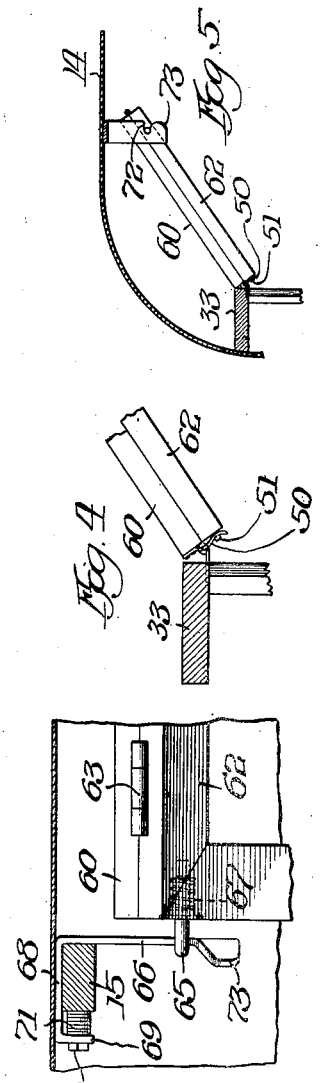

UNITED STATES PATENT OFFICE.

WALLACE E. HOWARD, OF CHICAGO, ILLINOIS.

AUTOMOBILE-INCLOSURE.

1,313,186.         Specification of Letters Patent.         Patented Aug. 12, 1919.

Application filed January 21, 1918. Serial No. 213,000.

*To all whom it may concern:*

Be it known that I, WALLACE E. HOWARD, a citizen of the United States, residing at Chicago, in the county of Cook and State of Illinois, have invented certain new and useful Improvements in Automobile-Inclosures, of which the following is a specification.

My invention pertains to improvements in inclosures, housings, or tops for automobiles and similar vehicles and relates more particularly, but not necessarily exclusively, to the side walls of such closures used with the ordinary folding, or so-called "summer" tops, whereby to provide suitable and adequate shelter from the elements.

One leading object of the invention is the production of an appliance of this kind which shall be simple in structure, pleasing in appearance, economical to manufacture, noiseless, easy to put in place and demount without injury or damage to the car, and operable with facility, and which may have glass as distinguished from the easily scratched or marred celluloid window panes to permit ready, unobstructed or clear view on all sides.

In order that those skilled in this art may have a full and complete understanding of this invention and its various advantages both from structural and functional standpoints, I have illustrated a preferred and desirable embodiment of the invention in the accompanying drawings, forming a part of this specification, and throughout the various views of which like reference characters refer to the same parts.

In these drawings:

Figure 1 is a fragmentary side elevation of an automobile equipped with the new and improved inclosure;

Fig. 2 is a longitudinal vertical section through the vehicle showing the side-wall windows or upper door portions opened up; and Figs. 3, 4, 5, and 6 are fragmentary detail sections which will be described more specifically hereinafter.

Inasmuch as both sides of the appliance or housing are the same in structure, a description of one side, both as to structure and operation, will suffice for a complete understanding of the invention.

Referring to the drawings, it will be noticed that the automobile body 10, provided with the usual hinged front and rear doors 11 and 12, respectively, with the intervening portion 13 of the body-wall, is equipped with the customary foldable fabric, leather, or other so-called "summer" top 14, stretched over and supported by conventional bows 15 and 16 mounted at their lower ends on the common outstanding brackets or studs 17 and 18 and equipped with the supplemental top bows 19 and 20, all of the usual and ordinary construction, such as is employed, for example, on the well-known Ford car. As is usual, the vehicle is provided with front and rear seats 21 and 22 equipped with upholstered backs 23 and 24, the car also having the ordinary windshield 25.

At the front on each side of the automobile, an upright post 26 is secured by one or more suitable clamps 27 to the edge of the windshield or its supporting bar. At the end of the front seat an intermediate vertical post 28 is provided which has a notch at its lower end adapted to straddle the bracket or stud 17 and be supported thereon between the bow 15 and the side-wall of the car. In order to maintain this post 28 in proper relation to the bow, a pair of clamps 29, 29, are employed which partially encircle the bow and are secured by suitable screws or otherwise to the outer face of the post. In similar manner, a rear upstanding post 30 is provided which is notched or recessed at 31 so as to extend over and rest upon the stud or bracket 18 between the bow and the vehicle side-wall. In order to hold such post firmly in place, it is fastened to the adjacent bow 16 by a pair of clamps or other similar securing appliances 32, 32, which may be of any desirable construction, and conveniently fastened to the post 30 by screws.

The tops of these three posts 26, 28, and 30, are in the same plane and have located above them and secured to them a horizontal board 33 of varying width, to conform to the outline of the car, and located beneath and just inside of the top fabric 14.

That portion of the board 33 above the front door is cut away along its inner edge at 34 (Figs. 1 and 6), for the accommodation of an intermediate supporting bar or strip 35 hinged at its rear end at 36 to the main supporting board 33 and equipped at its opposite or free end with a plate 37 secured to its uper face and projecting beyond its end, constituting a stop adapted to rest on the top of the board 33 when the strip 35 is in horizontal position to maintain it in such relation in which position it substantially fills the recess or gap 34 provided for its reception under such conditions. It will be appreciated, therefore, that this bar when in its lower position, is in register with the board 33 to which it is hinged at one end, as shown in Fig. 1, and that such member may be swung up in a plane lengthwise the vehicle, turning about its hinged end into the dotted position illustrated in Fig. 2.

The overhanging part of such stop plate 37 is slotted at 38, (Fig. 6), for the accommodation of the upturned part of a bar 39 having a foot 40 secured to the board 33, the top end of the bar 39 having a cross-pin 41 acting as a stop to limit the upward movement of member 35.

The front side window or upper door portion of the inclosure located above the hinged front-door 11 comprises two sash frames 42 and 43, each with its pane of glass, the two frames being hinged together at 44, 44, the upper frame being hinged at 45, 45, to the edge of bar 35, (Fig. 6).

The combined window or door 42, 43, when in closed position, has the two parts in vertical register as shown in Fig. 1, the entire window being supported on the hinges 45, 45, the edges of the combination window being received in rabbets 46 and 47 in the vertical edges of the two upright posts 26 and 28.

In order to hold the folded or collapsed duplex window in elevated or raised position, as shown in Figs. 2 and 6, the edge of sash 42 is equipped with a projecting pin 48, adapted to co-act with a stationary catch 49 depending from the bow 15, and to hold or maintain the sash 43 folded against the lower face of the sash 42, the former is provided with a spring-catch which is the same as one used for the duplex window above the rear side door and illustrated in Fig. 4, comprising a spring member 50 secured to the upper sash and apertured for coöperation with a pin 51 projecting from the lower sash.

In order to close the space laterally between the lower edge of this compound window and the door and side-wall above which it is located, the inner edge of sash 43 may be provided with one or more side projections 52 and 53, the shape of which would necessarily vary for different makes of cars.

This front side window or upper door portion is operated practically as follows:

Assuming that the window is closed and it is desired to open it, the operator grasps the lower edge of the sash 43 and lifts it, and, owing to the hinged connection, the duplex window or door portion collapses and rises simultaneously, escaping the end of the front seat, and is elevated to the position indicated in Fig. 6, the member 35 swinging upwardly with the compound window or door, all of the parts being held in the elevated position by the catch 48, 49, the part 43 being held to the part 42 by the catch 50, 51, not shown, for this portion of the vehicle, but illustrated in Fig. 4 in association with the rear window described hereinafter. When it is desired to close or lower this window or upper door portion, the operator releases the catch 50, 51, and by permitting the descent of the part 43, the folded structure unfolds, the bar 35 swings down into place, and the two window sections come automatically to the same vertical plane, escaping the end of the front seat and fitting neatly into place, being supported wholly from above. During such descent of the window the lock or catch 48, 49, automatically releases. If desired, the window may be held or locked in closed relation by means of a turn button 54, operable from either outside or inside the vehicle, which maintains the window tight against the firm and rigid posts, thus preventing rattling and rumbling.

It should be observed that this duplex window or combination door section is supported wholly from above, depending from the main upper support 33, and that if desired, a small space may be provided between the lower edge of the bottom sash 43 and the top edges of door 11 and side-wall 13 where they overlap, thus obviating any possibility of the parts rubbing on one another with resulting squeaking or other objectionable sound. Attention is also directed to the fact that by hinging this two-part window to the intermediate hinged bar 35 instead of directly to the main support 33, the folded elevated window occupies a double-inclined position, one inclination conforming in a general way to the forward slope of the top 14, thus providing adequate head room for persons entering, leaving, or occupying the front seat.

This side-wall inclosure comprises also a middle window or door section above the rear side door of the body and also above other portions of the body side-wall, and consists of an upper glass-equipped window-sash 60 hinged at 61, 61 directly to the board 33 and a similar sash 62 hinged at 63, 63, to the lower edge of the companion upper-sash. The lower inner edge of sash 62 may, if desired, be provided with one or more filler strips 64 to close the space between the window and the body proper of the vehicle, because in some instances these windows will not necessarily be in exact vertical register with the body side-wall, due to the usual plan of making the top somewhat broader than the body. Such overhang, if it is present, is not objectionable because it gives the occupants more elbow room and in some cases gives the car more pleasing lines than it would otherwise have.

As in the other instance, the top sash 60 has an outstanding pin 65 adapted to coöperate with a leaf catch 66 to maintain the sash in raised or elevated position, as illustrated in Fig. 2. The two locks 48, 49 and 65, 66, are alike and a complete description of the latter will suffice for both. Pin 65 is slidingly mounted in a cavity in sash 60 (Fig. 3), and is pressed outwardly by a spring 67 received in the cavity and bearing at one end against an enlargement on the pin. The catch 66 comprises a bent bar having a horizontal part 68 disposed above bow 15 terminating in a downturned apertured ear 69 secured to the side of the bow by a screw 70 and in order to obtain an adjustable disposition of the catch one or more washers 71 may be interposed between the car and the adjacent side of the bow and through which the screw passes. The part 66 of the catch has a notch 72 (Fig. 5) for the receipt of the pin and the lower end portion of the part 66 is bent at 73 to facilitate the engagement of the spring-pressed pin with the catch. While this form and style of locking means is convenient and releases the window automatically upon its unfolding, the invention is not limited in any way to the character of the catch used.

The posts 28 and 30 are rabbeted at 74 and 75 to receive the edges of the window or door when it is lowered or closed and it may be maintained firmly in closed position and against rattling by a turn-button 76 which may be manipulated from either the outside or inside of the car.

The operation of this duplex or hinged door or window will be obvious from what precedes, and requires no further explanation except to state that, because it is hinged directly to the support 33, when it is folded up into the fabric top and held by the catches 65, 66 and 50, 51, it is inclined transversely only of the vehicle and not also longitudinally as is the case of the front side window or door.

Each side of the inclosure also includes a rear side-window opposite the back-seat and comprising a glass-fitted sash 80, the front part of which is screwed or otherwise fastened at 81 to the adjoning post 30 which is cut away or rabbeted at 82 for the accommodation of the sash. Such window-sash is also provided with a sheet-metal or other suitable extension 83 both below and to the rear of the sash and shaped to conform to the contour of the car. Such extension or filler is fastened at the rear to the back 84 of the fabric or foldable top by means of the usual buttons 85. If desired, such rear window structure may be secured to board 33 but this is ordinarily unnecessary.

Attention is directed to the fact that the added posts are supported solely by the bow brackets or studs and the windshield or some part of it, and also that all of the windows or upper doors in turn are carried by these posts through the long horizontal board which acts not only as a main supporting member, but also as a filler or closure to fill in a limited portion of the space under the top, that is, the space between the windows and the adjacent fabric top. It should also be observed that this inclosure structure is held in place without marring the body of the vehicle in the slightest degree, and that it can easily be removed and replaced, depending upon weather conditions and varying seasons.

The invention is not limited and restricted to the precise and exact structural features presented because many minor mechanical changes may be incorporated in the construction without departure from the substance and underlying principles of the invention and without the sacrifice or loss of any of its substantial benefits and advantages.

I claim:

1. In a vehicle inclosure of the character described, the combination of a main upper support, a supplemental support hinged thereto, a window hinged to and carried by said supplemental support and comprising upper and lower rigid sash-members hinged together permitting the folding of the window with the outer faces of its members together, and a catch to hold the folded window in elevated position, substantially as described.

2. In a vehicle inclosure of the character described the combination of a main upper support, a supplemental support hinged thereto and adapted to swing in a substantially vertical plane lengthwise the vehicle, a window hinged to and carried by said supplemental support and comprising upper and lower rigid sash-members hinged together permitting the folding of the window with the outer faces of its members together, and a catch to hold the folded window in elevated position, substantially as described.

3. In a vehicle inclosure of the character described, the combination of a main upper support, a supplemental support hinged thereto, means to limit the upward and downward swinging of said supplemental support, and a window hinged to said supplemental support and comprising upper and lower sash-members hinged together, substantially as described.

4. In a vehicle inclosure of the character described, the combination of a main upper support, a supplemental support hinged thereto, means to limit the upward and downward swinging of said supplemental support, a window hinged to said supplemental support and comprising upper and lower sash-members hinged together, and a catch adapted to hold said upper sash-member in elevated position, substantially as described.

5. In a vehicle inclosure of the character described, the combination of a main upper support, a supplemental support hinged thereto, means to limit the upward and downward swinging of said supplemental support, a window hinged to said supplemental support and comprising upper and lower sash-members hinged together, a catch adapted to maintain said upper sash-member in elevated position, and a catch to lock said lower sash-member to said upper sash-member while both are in elevated position, substantially as described.

6. In a vehicle inclosure of the character described, the combination of a main upper support, a supplemental support hinged thereto and adapted to swing in a substantially vertical plane lengthwise the vehicle, a window hinged to said supplemental support and adapted to swing in a plane transverse of the vehicle and comprising upper and lower sash-members hinged together, means to limit the upward and downward swinging of said supplemental support, a catch for said upper sash-member adapted to hold it in elevated position, and a catch adapted to lock said lower sash-member to said upper sash-member while both are in elevated position, substantially as described.

7. The combination of a vehicle having a foldable top with one or more bows and their supporting brackets secured to the vehicle body, posts supported by said brackets inside of said bows, means to secure said posts to said bow or bows, an upper substantially-horizontal support mounted on said posts, a supplemental support hinged to said upper support and adapted to swing in a substantially-vertical plane lengthwise the vehicle, a window hinged to said supplemental support and comprising upper and lower rigid sash-members hinged together permitting the folding of the window with the outer faces of its members together, a catch to hold the folded sash members face to face, and a catch to hold the folded window in elevated position, substantially as described.

WALLACE E. HOWARD.